(12) United States Patent
Kurelek

(10) Patent No.: US 7,007,728 B2
(45) Date of Patent: Mar. 7, 2006

(54) KNUCKLE BOOM FOR REACHING AND PULLING AND HYDRAULIC CIRCUITS THEREFOR

(75) Inventor: John Kurelek, Brantford (CA)

(73) Assignee: Tigercat Industries Inc., Paris (CA)

( * ) Notice: Subject to any disclaimer, the term of this patent is extended or adjusted under 35 U.S.C. 154(b) by 23 days.

(21) Appl. No.: 10/648,281

(22) Filed: Aug. 27, 2003

(65) Prior Publication Data

US 2005/0045245 A1    Mar. 3, 2005

(51) Int. Cl.
*A01G 23/08*    (2006.01)

(52) U.S. Cl. .................. 144/4.1; 144/34.1; 144/382; 37/348

(58) Field of Classification Search ............ 144/4.1, 144/34.1, 335–339; 52/216; 37/302, 348; 414/680, 694, 685–688; 91/534, 536
See application file for complete search history.

(56) References Cited

U.S. PATENT DOCUMENTS

| | | | |
|---|---|---|---|
| 2,598,233 A | 5/1952 | Deardorff | |
| 3,583,585 A | * 6/1971 | Joyce | .................. 414/694 |
| 3,590,760 A | 7/1971 | Boyd | |
| 3,960,284 A | 6/1976 | Carpenter | |
| 4,446,897 A | 5/1984 | Kurelek | |
| 4,898,219 A | 2/1990 | Pomies | |
| 5,107,912 A | 4/1992 | Cote et al. | |
| 5,170,825 A | 12/1992 | Elliot | |
| 5,293,914 A | 3/1994 | Hudson | |
| 5,979,518 A | 11/1999 | Hamby | |
| 6,443,196 B1 | 9/2002 | Kurelek | |
| 6,557,453 B1 | 5/2003 | Paakkunainen et al. | |
| 6,763,863 B1 | * 7/2004 | Liu | ................ 144/4.1 |

\* cited by examiner

*Primary Examiner*—Derris H. Banks
*Assistant Examiner*—Shelley Self
(74) *Attorney, Agent, or Firm*—R. Craig Armstrong; Borden Ladner Gervais LLP

(57) ABSTRACT

When arranging the geometry of knuckle booms with efficient hydraulic circuits it is sometimes necessary to place the cylinder that provides the reaching force above the boom so that its base area rather than its rod end area provides the boom point motion and force in the pulling direction. It is also sometimes necessary to provide equal areas for both pushing and pulling by further modifying the reach cylinder installation. In the invention, the knuckle boom apparatus has a machine base, a hoist boom and a stick boom. The stick boom has an intermediate pivot pinned to pivot on the distal end of the hoist boom, and a proximal end having a suitable cylinder push point. At least one hydraulic hoist cylinder is mounted between the machine base and the hoist boom, and at least one hydraulic stick cylinder is mounted between the hoist boom and the stick boom. A hydraulic reach cylinder is mounted above the hoist boom between the hoist boom and the suitable push point, whereby when the hydraulic reach cylinder is actuated by supplying oil to its base end, the distal end of the stick boom is withdrawn towards the machine base. The hydraulic circuit has at least one hydraulic conduit line connecting respective base end ports of the hoist and stick cylinders so as to allow hydraulic oil to shunt between base ends of the hoist and stick cylinders.

8 Claims, 11 Drawing Sheets

KNUCKLE BOOM FOR REACHING AND PULLING AND HYDRAULIC CIRCUITS THEREFOR

BACKGROUND OF THE INVENTION

1. Field of the Invention

This invention relates to achieving more energy-efficient horizontal motion of a two-member knuckle boom, especially but not necessarily those which carry a tree-handling tool at the distal end thereof. The term "tree-handling tool" throughout this specification is intended to encompass, for example, tree felling; tree limbing heads; tree processing heads; wood-handling grapples for piling or loading trees or logs; and other such tools in the tree-harvesting industry.

2. Description of the Prior Art

A typical two-member knuckle boom comprises a hoist boom having a proximal end pivoted to the machine base, and a stick boom having a proximal end pivoted to the distal end of the hoist boom. In the tree-harvesting industry, a tree-handling tool such as grapple tongs would be mounted on the distal end of the stick boom. A hoist cylinder is mounted between the machine base and the hoist boom, and a stick cylinder is mounted between the hoist boom and the stick boom.

The invention expands on the concepts described and claimed in Canadian patent no. 2,317,670, granted Jul. 16, 2002, and in corresponding U.S. Pat. No. 6,443,196, granted Sep. 3, 2002 (hereinafter referred to as "the prior Kurelek patents"). The prior Kurelek patents explained the concept of a hydraulic circuit for a knuckle boom which provides connecting hydraulic lines between the working ends of the hoist and stick cylinders providing an oil flow so as to enable shunting of hydraulic oil between the cylinder working ends. When these cylinders are alternately extending and contracting during reaching actions with the tool carrying knuckle boom, such as is always a part of tree harvesting, the circuit in that invention shunts load supporting hydraulic oil between the cylinders rather than dumping it to tank as with previous conventional circuits. This has resulted in reduced working horsepower, i.e. fuel used and heat generation, and the ability of the operator to do reaching and tucking by operating just one lever, while continuing to do lifting and lowering with the other. This is explained in detail in the prior Kurelek patents.

In the prior Kurelek patents, there is no direct control of the shunting of hydraulic oil, for example via a valve or pump. Instead, the "reach" movement of the boom (i.e. generally horizontal extension or retraction) is controlled by an additional hydraulic cylinder, acting as a "reach" cylinder, mounted between the hoist and stick booms. In one sense, the reach cylinder in effect controls or constrains the shunting of oil between the working ends, since the reach cylinder determines the relative positions of the hoist and stick cylinders. The reach cylinder operates one of the knuckle boom angles, usually working alongside the stick cylinder, and causes the load supporting oil to flow back and forth between the hoist and stick cylinders. In practice, tree harvesting machines with the concepts of the prior Kurelek patents do function with benefits as described, and have already become well-accepted by users.

The reach cylinder does not normally do major load supporting work but is required to provide the horizontal push and pull forces at the tool. Thus when as described in the prior Kurelek patents, the reach cylinder is located beneath the boom assembly, any push forces needed at the tool when reaching in an outward direction is obtained by pressurizing its base end. Since the base end area of typical modern logging machine cylinders is always about twice their rod end areas this is good for operations where the major knuckle boom function is to intermittently push hard on something under good speed control while reaching out, and to return quickly at light load while tucking back in.

FIG. 1 (prior art) is an example of such a prior invention case. The tree butt is gripped in a holder while the knuckle boom is reaching out to forcefully shear off limbs from the tree bole. After going through one of several options in bucking and placing the limbed tree part the boom must grasp and advance the next length of unlimbed tree so that it can be gripped by the holder for the next limbing stroke. Advancing the unlimbed tree with reach-in as it slides on the ground is usually much easier than it is to remove limbs on the stroke out, so the reach cylinder configuration and location in the prior Kurelek patents is good (for push type limbing).

The cylinder actions, hydraulic oil flows and operator controls, including the limbing-head-to-tree alignment, are taught in the prior Kurelek patents.

However, it has been realized by the inventor that there are applications of the efficient reach principle that would rather have the powerful steady stroke direction be when tucking in, rather than when reaching out.

FIG. 2 (prior art) depicts a logging operation that is often used in tree harvesting. Another illustration can be seen in Hamby, U.S. Pat. No. 4,899,794, FIG. 1. In this case the knuckle boom machine is basically a loader and has a grapple as the tool at the end of the stick. When limbing is wanted the loader at near full reach inserts the tree into a stationary limbing head and pulls it towards itself. Limbs are thus removed by a combined action of the conventional knuckle boom and swinging of the upper, as hydraulic oil is typically wastefully pumped into the base of the hoist cylinder and into the rod end of the stick cylinder. Davidson U.S. Pat. No. 5,406,997 FIG. 1 also shows a loader doing "pull-through" limbing apparently with swing action. It is obvious though that if only swinging is used there is much tail sweep of the tree so reaching in and out is usually also used. After disposing of the limbed and bucked log the grapple must race out empty, but still wastefully, to grasp the butt of the next bole to be limbed.

If the tool being used on the knuckle boom end is one that severs the tree off the stump at an extended reach then sometimes it is wanted (e.g. for processing) to forcefully drag the tree in closer to the machine against the resistance of ground friction or incidental limb contacts. The operator can well give up reach force in the extending direction when the empty head is carried above the ground and avoiding other tree stems, and instead get more pulling force.

In converting a knuckle boom to be more efficient according to the prior Kurelek patents we do achieve the efficient reach objective. Pressurized oil is exchanged between the stick and hoist cylinders during pulling in and reaching out. But the slower, higher force action of the extending reach cylinder would occur when going back with empty tongs to get the next bole and not when hard pulling might be wanted to remove limbs or extract an entangled felled tree: The quicker less forceful action of the rod end area would attempt to do the limbing (pulling) stroke. The operator would appreciate the ease of one hand operation and the generally faster reach speeds but unless major changes in pressures and cylinder sizes were made he would probably wish for more pulling force.

SUMMARY OF THE INVENTION

It is an objective of this invention to improve the application of "efficient reach" to the above-described type of operation. FIG. 4 shows that instead of locating the reach cylinder underneath the booms in the common tree working style we can separate it from the stick cylinder and place it above the booms. In this new position the reach cylinder is still hydraulically connected as in the prior Kurelek patents. The stick cylinder of this new invention remains in the same beneath-the-boom position as in the prior Kurelek patents and it is still connected to the hoist cylinder in the same way and is proportioned in size to the hoist cylinder in the same way. But in FIG. 4 it can be seen that oil applied to the more forceful base end of the reach cylinder will cause the knuckle boom to pull in, which is wanted. The same oil applied to the weaker rod end of the reach cylinder will now cause the stick boom tip to reach out at twice the speed, which is also wanted.

The idea to change the reach cylinder installation to suit a particular knuckle boom job is also useful in some other cases. FIG. 5 shows that when Kurelek's efficient reach is used on a grade leveling knuckle boom it too needs to have the reach cylinder on top so that its powerful push direction is used to cut the soil with the bucket lip. The operation of the sender and tilt cylinders shown in FIG. 5 is similar to that taught in the prior Kurelek patents where they are used to keep the felling head near vertical and the saw near horizontal during reach.

FIG. 6 deals with the case where a higher force is not needed in either direction, and high speed can be used in both directions. The reach cylinder has a rod at each end so that the same net piston area works in each direction. Such a device would work whether the reach cylinder was on top or underneath the boom but obviously it is easier to allow space for the base end protruding rod if on top. It is also possible to make the two rods of different diameters so that some variation from 1 to 1 in speeds and forces is obtained.

FIG. 7 illustrates what can be done if high limbing forces will happen in both directions e.g. if the tree is both pushed and pulled through a bi-directional head to remove particularly tenacious or heavy branches. There are two reach cylinders, one below and one above the boom, and if standard diameters are used the limbing forces available at similar knuckle positions will always be at least 50% higher than the maximum in FIG. 4.

Further details of the invention will be described or will become apparent in the course of the following detailed description.

DESCRIPTION OF THE DRAWINGS

The invention will now be described with reference to these accompanying drawings.

DETAILED DESCRIPTION OF THE INVENTION

Figure 1:
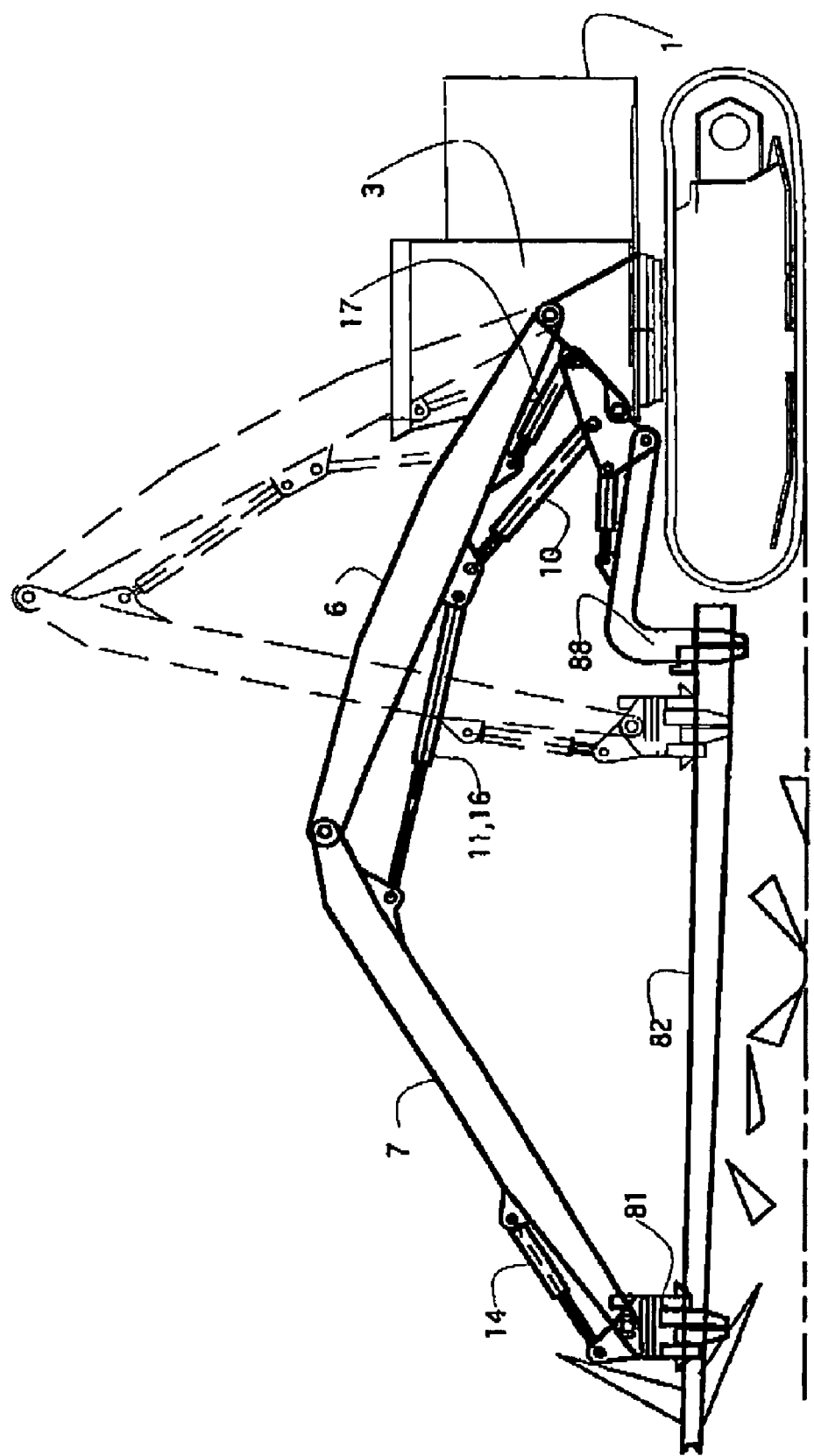
FIG. 1 (prior art) is a side elevation view showing how portions of the prior Kurelek patents are useful for tree limbing where the knuckle boom pushes a limbing head along the tree to shear off limbs.

FIG. 1 (prior art) is pertinent to this limbing improvement invention because it illustrates a limbing operation method already possible using the prior Kurelek patents to get fast, efficient and forceful tree handling and limb removal. The knuckle boom is mounted on a carrier 3 which also has a tree butt holder 88 into which the tree 82 is inserted by using the limbing head 81 and the knuckle boom loader comprised of hoist boom 6 and the stick boom 7 as shown in dotted outline. Then by operating the reach cylinder 16 and relying on hoist cylinder 10 and stick cylinder 11 to work as taught in the prior Kurelek patents limbs are sheared off the tree bole as the limbing head reaches out. Methods of closing the arms of the head on the tree as the bole size tapers are well known in the industry. Aligning the axis of the limbing head with the tree during the reach stroke is done by employing sender cylinder 17 and tilt cylinder 14 as also taught in the prior Kurelek patents. It is obvious that the limbing head and its controls must be designed primarily for removing branches cleanly and that usefulness of the carrier and knuckle boom for doing other common loader work would be reduced. Hence the industry preference for the limbing method of FIG. 2.

Figure 2:
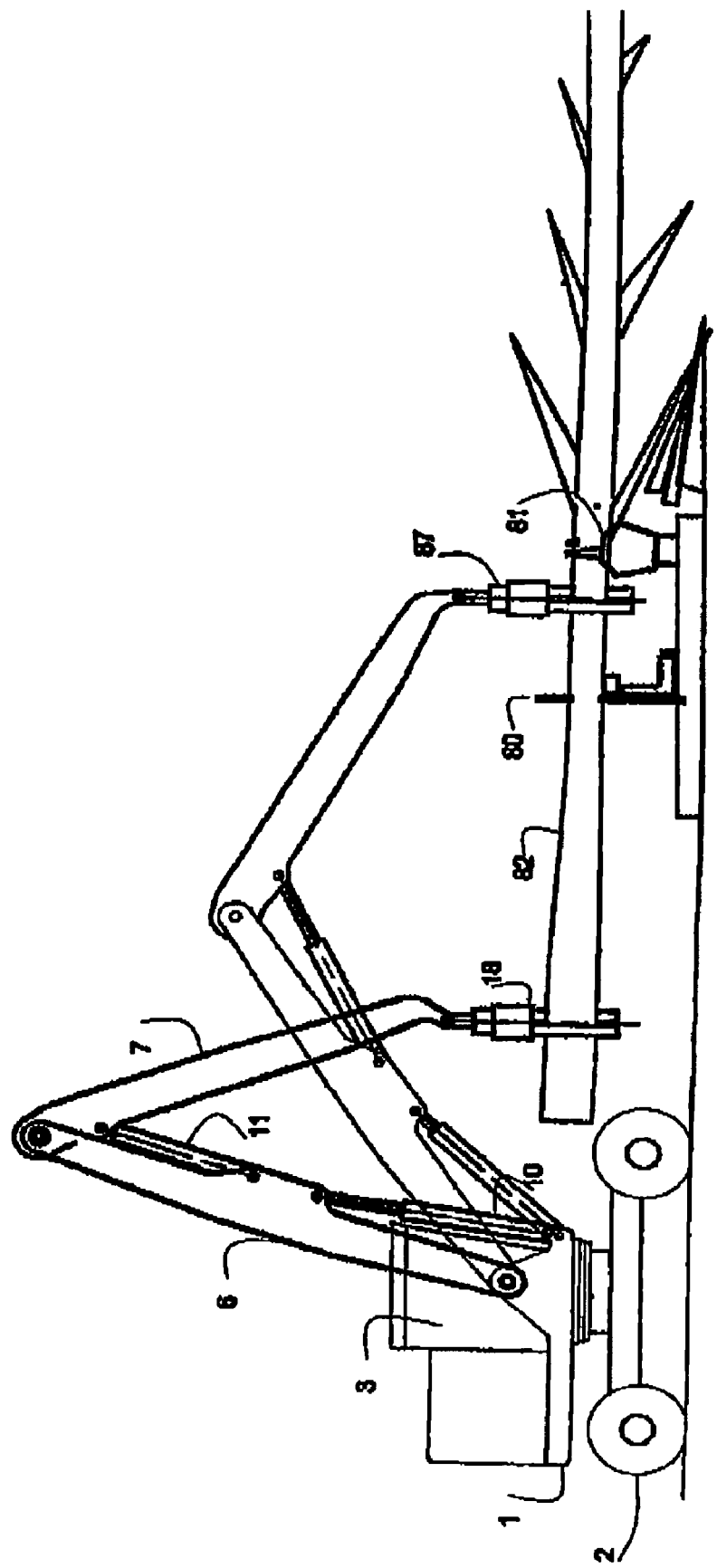
FIG. 2 (prior art) is a side elevation view showing typical prior art knuckle boom limbing of trees where the knuckle boom pulls the tree through a fixed limbing head to shear off limbs.

FIG. 2 (prior art) shows the common prior art in the industry for using an almost fully capable loader machine to also do pull-type limbing. The carrier 3 in this drawing has a conventional prior art knuckle boom comprising of hoist boom 6, stick boom 7, hoist cylinder 10, stick cylinder 11 and a grapple 18. Beside the loader there is a limber chassis 83 on which Is mounted a limbing head 81. The loader grapple is used to place the tree bole butt in the limbing head at position 87 and with the limber arms closed on it the loader pulls the tree, using reach tuck and some swing to remove limbs. The saw 80 can be used to buck off a log, which can be piled or loaded before reaching out to position 87 again for another limbing pull. Although this is a practical way to use a conventional loader it still retains the faults which the prior Kurelek patents avoided, namely the operator must use two levers to do reach, unnecessary oil heat is generated, fuel and power is wasted and the reach is not fast. Before examining how the present new invention allows the application of those benefits to this pull type of loader limbing it would be helpful to study the following description of those previous teachings with reference to FIGS. 3 and 3B (both prior art).

Figure 3:
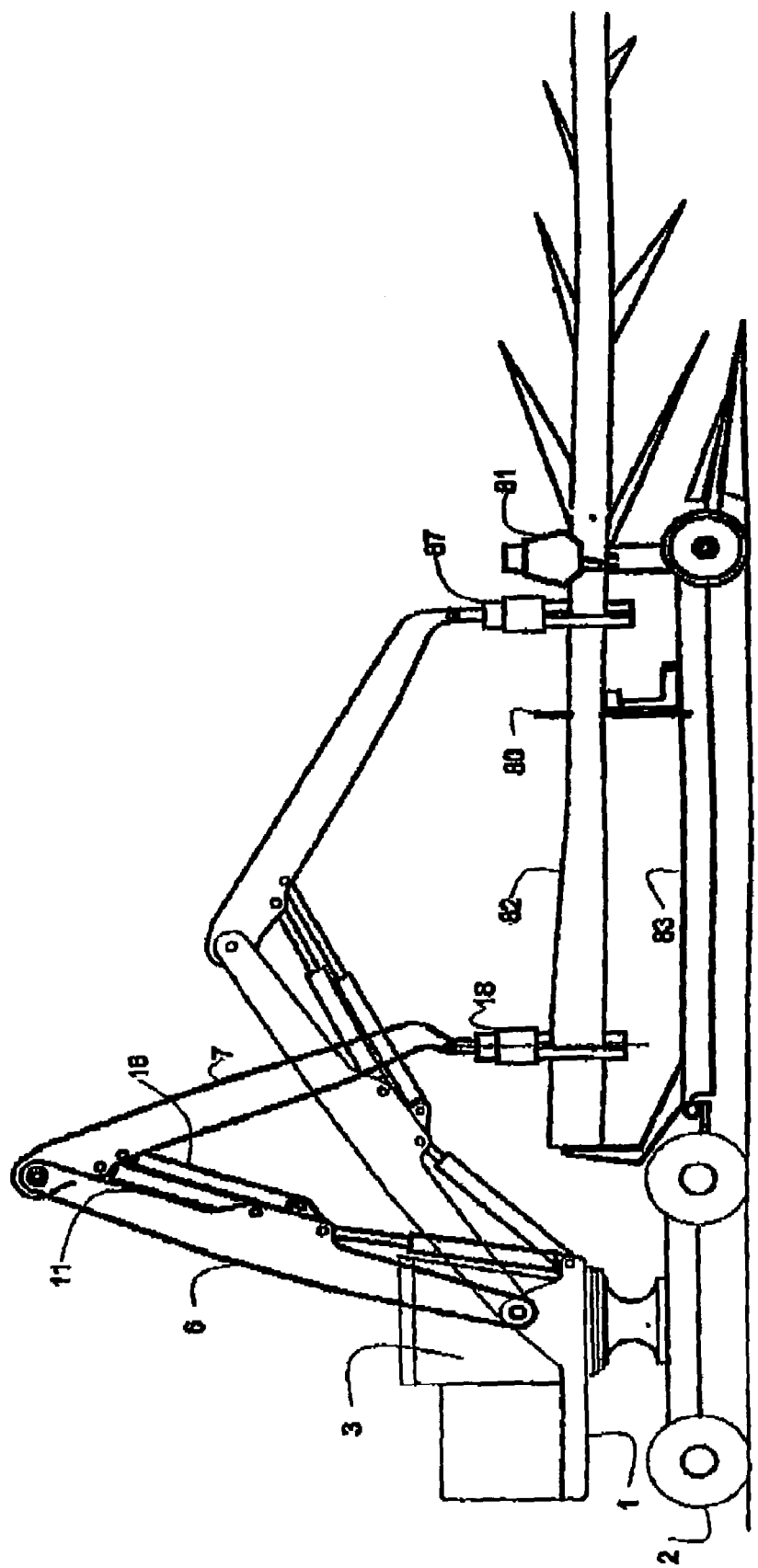
FIG. 3 (prior art) is a view showing how portions of the prior Kurelek patents are useful for tree limbing where the knuckle boom pulls the tree through a limbing head with efficient action but without a high available force.
Figure 3B:
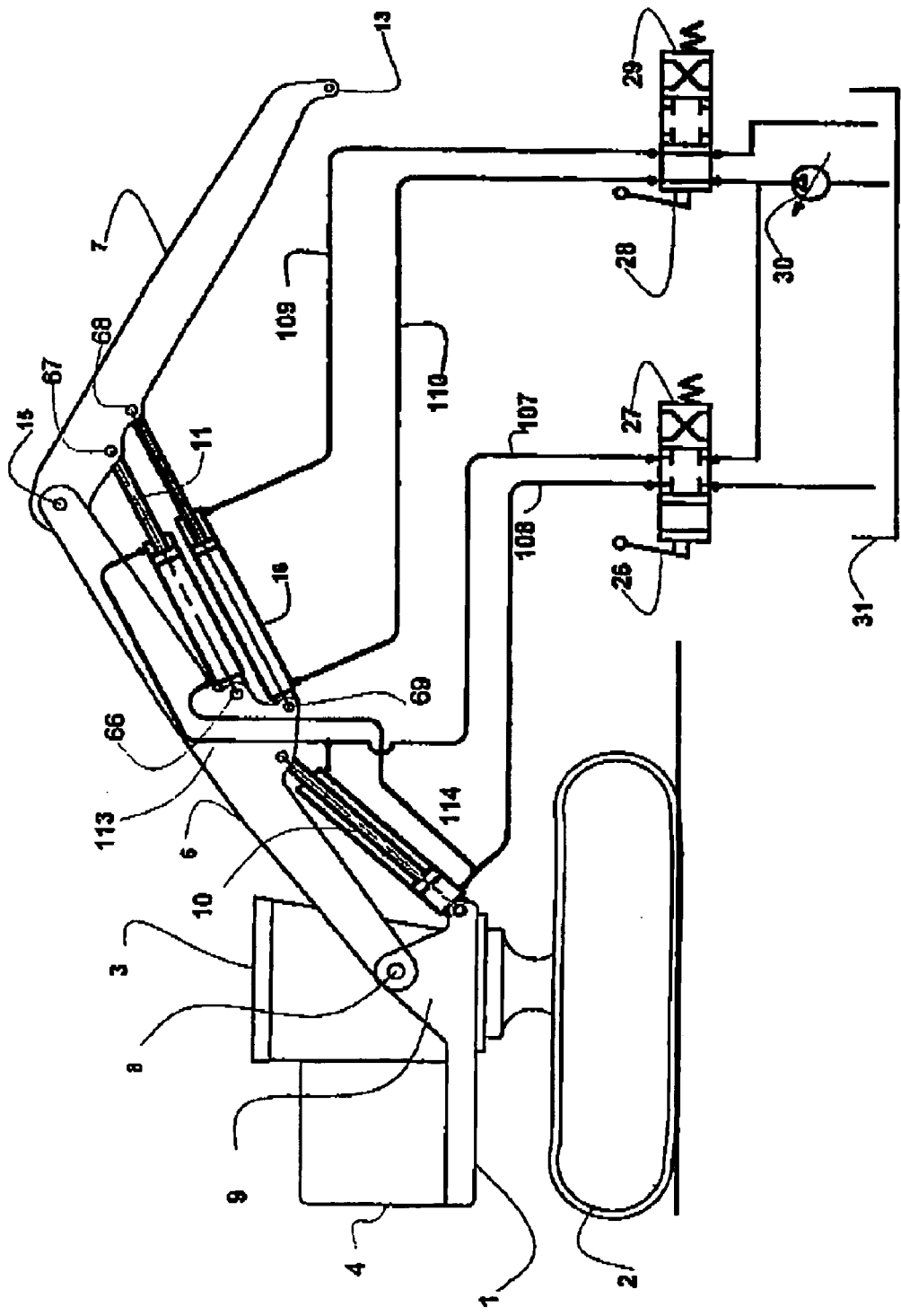
FIG. 3B (prior art) shows details of the hydraulic connections used in FIG. 3.

FIGS. 3 and 3B (both prior art) show the portions of the embodiment of the prior Kurelek patents that are pertinent to the new invention, for pull-type loader limbing. There is an upper machine 3, a machine base 1 supported above suitable tracks or wheels 2. A diesel engine 4 is cantilevered on the back of the machine base. The knuckle boom assembly comprises a hoist boom 6, and a stick boom 7. The hoist boom is pivotally mounted relative to the machine base at a hoist-base pivot pin 8 on a mounting bracket 9 secured to the machine base. The stick boom is pivotally connected to the distal end of the hoist boom at a hoist-slick pivot pin 15. The hoist boom is actuated by at least one hydraulic hoist cylinder 10 connected between the machine base and the hoist boom, at an effective angle relative to the hoist boom. The stick boom is actuated by at least one stick cylinder 11 connected between the hoist boom and the slick boom, at an effective angle relative to the stick boom. A reach cylinder 16 is also connected between the hoist boom and the stick boom, at an effective angle relative to the stick boom. A tool, such as a tree grapple, is carried at 13 at the distal end of the stick boom.

The simplified schematic superimposed on FIG. 3B (prior art) shows how the hydraulic connections are made to reduce reach energy consumption with an embodiment of the prior Kurelek patents. The lift directional control valve 27 is controlled by the operator with lever 26. Conduits 108 and 114 connect the base end ports of both the hoist cylinder and the stick cylinder to one of the work ports of valve 27. Conduits 107 and 113 connect the rod end ports of both the hoist cylinder and the stick cylinder to the other work port of valve 27. Conduit 114 in effect unites the base end volume of the hoist cylinder 10 with the base end volume of the stick cylinder 11. That is, the hoist cylinder and stick cylinder base ends are piped together and to a valve work port with hydraulic conduit, so that they share a common load-supporting pressurized volume or "slug" of oil behind their pistons.

A reach (directional) control valve 29 has its work ports connected by means of conduits 109 and 110 to the two ports of the reach cylinder so that the operator can stroke it with lever 28, getting oil from pump 30. As the reach cylinder is stroked, its mechanical connection with the stick cylinder lugs forces the stick cylinder to stroke as well. When thus forced to stroke, the stick cylinder must exchange oil with the hoist cylinder via lines 113 and 114 and causes it to stroke and raise or lower the hoist boom. According to the prior Kurelek patents the cylinder installation geometry is such that the oil exchanged by the hoist cylinder with the stick cylinder through the conduit 114 is the correct amount to maintain the stick boom point 13 at a nearly constant height as the reach cylinder is stroked.

When the lift valve is operated alone, i.e. while leaving the reach valve not shifted, the reach cylinder will lock the stick cylinder with it, so oil flowing in line 108 can only cause the hoist cylinder to stroke and so raise or lower the tool about pivot pin 8.

Hence the prior Kurelek patents have established an art in hydraulic circuits for knuckle booms that saves energy by transferring load supporting pressurized oil between hoist and stick cylinders during reaching and at the same time gives the operator single lever reach control. The already pressurized oil is caused to flow directly between cylinders by adding a reach cylinder to the knuckle boom.

FIG. 3 (prior art) shows how this is applied to a limbing head 81 mounted on a chassis 83. A grapple 18 is moved with reach action to the 87 location and then back with tuck to pull lengths of tree 52 through the limber and buck them off with the saw 80. Thus the loader in FIG. 3 (prior art) fits into the job exactly the same as the loader of FIG. 2 but being of the energy efficient type is an improvement over the prior art of FIG. 2. However because the smaller rod end area of the reach cylinder is used to pull the tree in the direction of limb removal and the larger base end area is used to go back empty there is an opportunity for further improvement.

Figure 4:
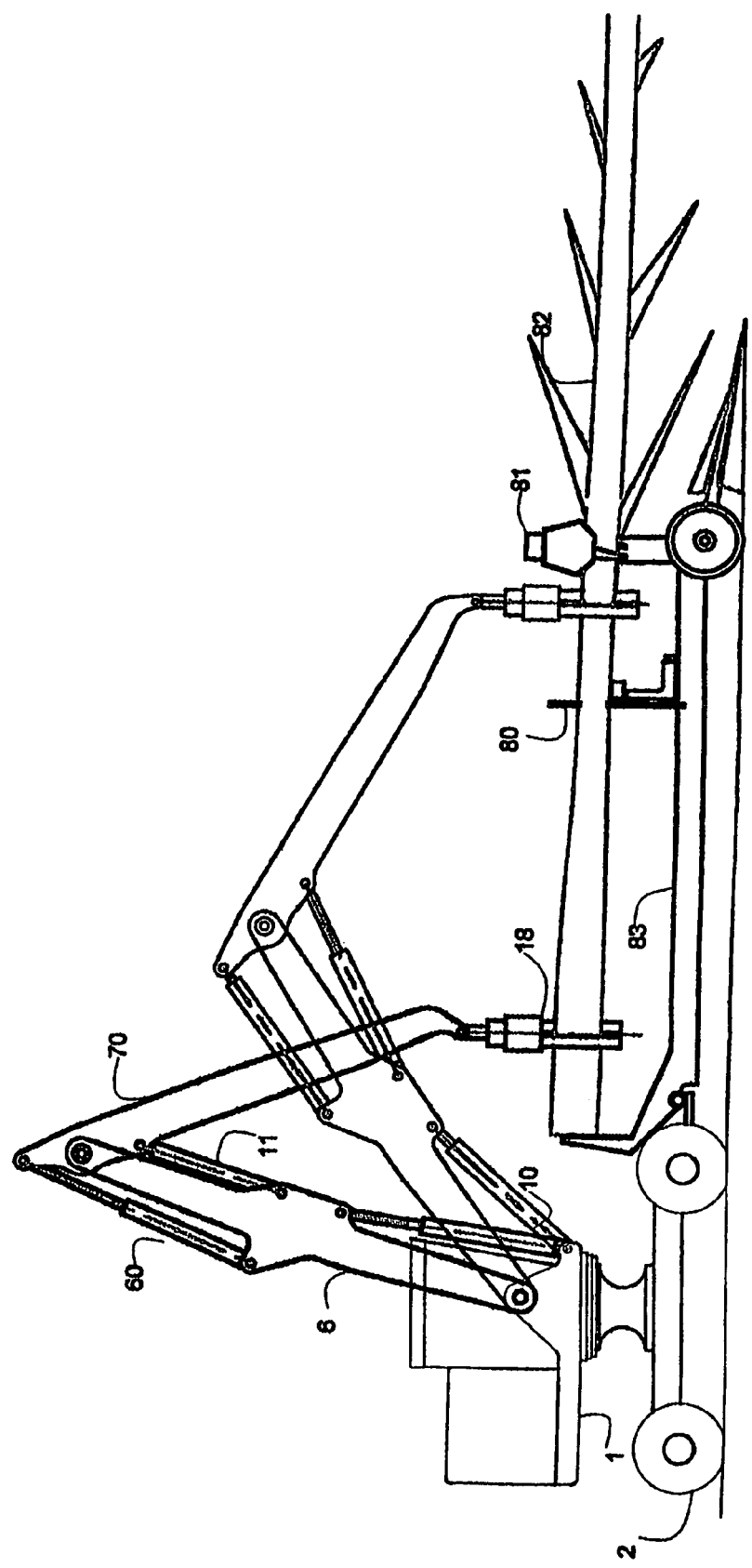
FIG. 4 is a view showing how this present invention is useful for tree limbing where the knuckle boom pulls the tree through a limbing head to shear off limbs with an efficient action and a high available force.
Figure 4B:
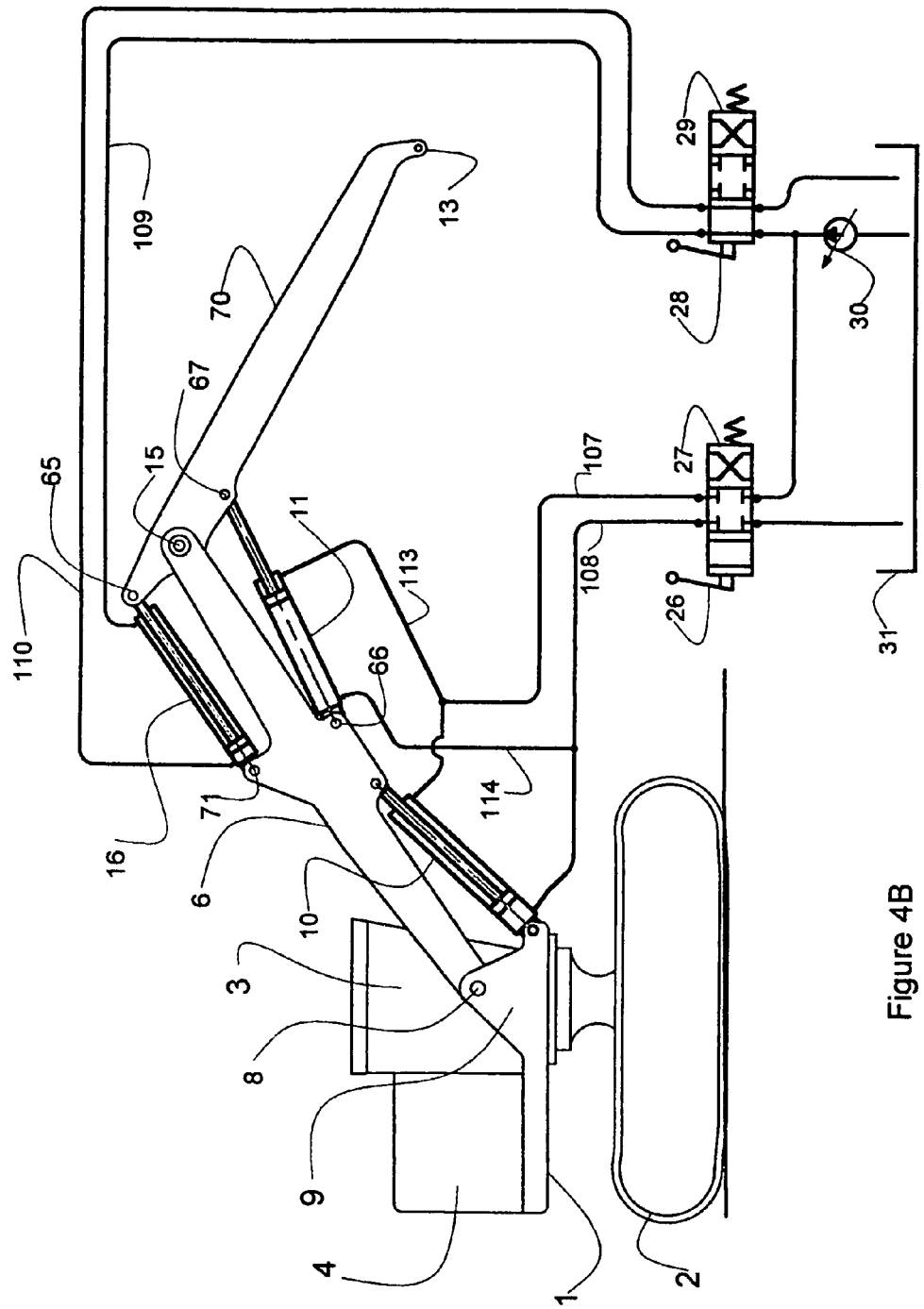
FIG. 4B shows details of the hydraulic connections used in FIG. 4.

In the present invention, as illustrated in FIGS. 4 and 4B, there is an additional performance improvement in that the limbing force available with given equipment size is doubled and the empty return speed can also be doubled. Comparing FIG. 4B with FIG. 3B (prior art) the significant difference that causes the improvement is that the reach cylinder 16 has been moved from beneath the booms where it was pinned to the hoist boom at pin 69 and to the stick boom at pin 68 to above the hoist boom where it is pinned at its base end to the hoist boom with pin 71 and to an extension crank of the stick boom with pin 65. In this position of the reach cylinder, extending it to cause pull at the grapple 18 is done by applying oil pressure to its base end which has approximately twice the area of the rod end used to pull the tree through the limber in FIGS. 3 and 3B (both prior art).

Figure 5:
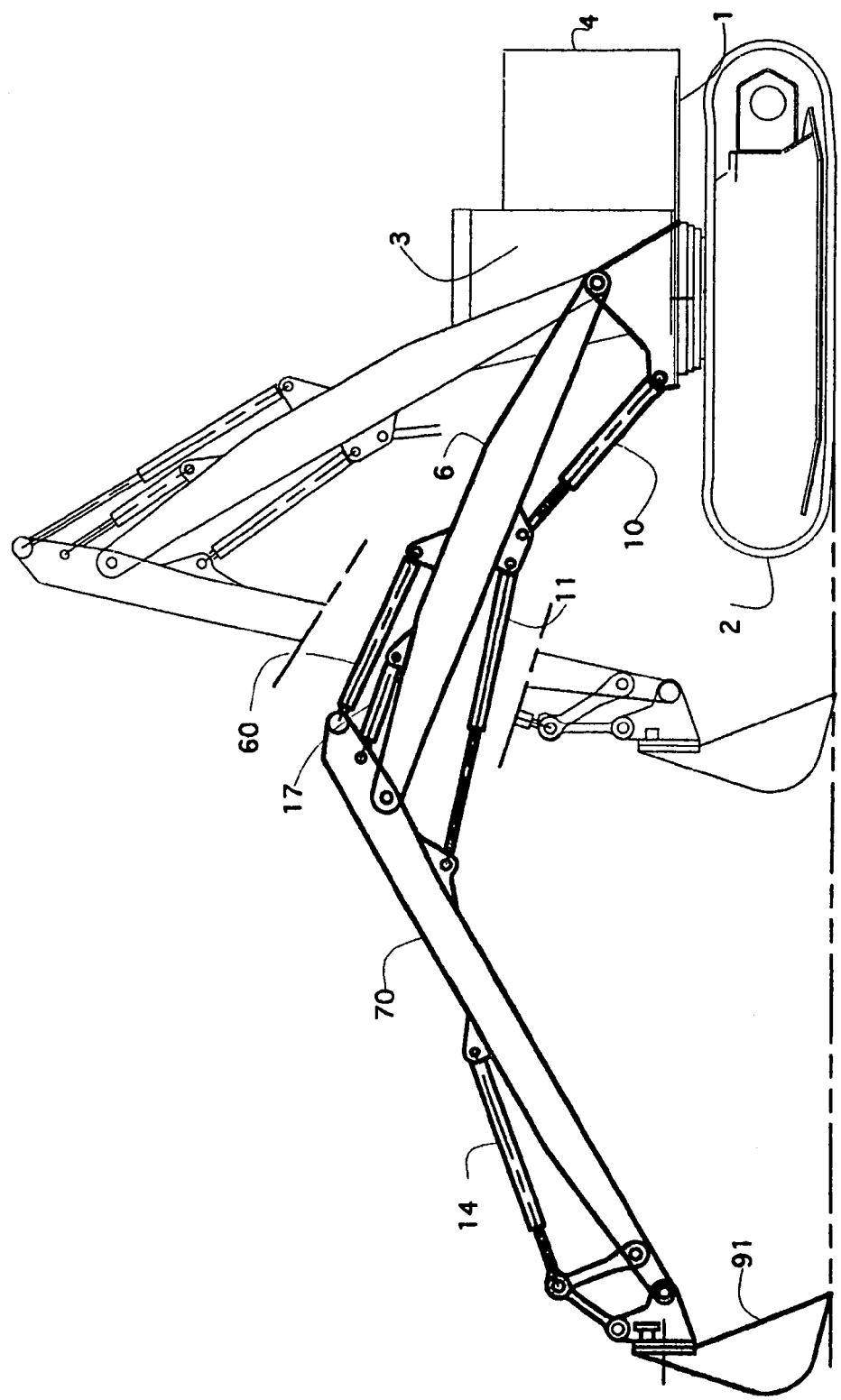
FIG. 5 shows how this present invention is useful for leveling and smoothening earth materials with a grading bucket.

FIG. 5 is another case, where the reach cylinder of the prior Kurelek patents is better to be located on top of the boom. All the items used to explain its operation are the same as in FIG. 4 except there is a scraper bucket 91 instead of a grapple. Also, similar to the limbing head 81 in FIG. 1, the bucket attitude is shown controlled by a sender cylinder 17 and a tilt cylinder 14. Usually it is wanted to cut into the ground with the bucket lip while tucking towards the carrier. Since efficient reach art can be set up to accurately scrape a level grade it is particularly useful to have the extra pull force provided by the top located reach cylinder.

Figure 6:
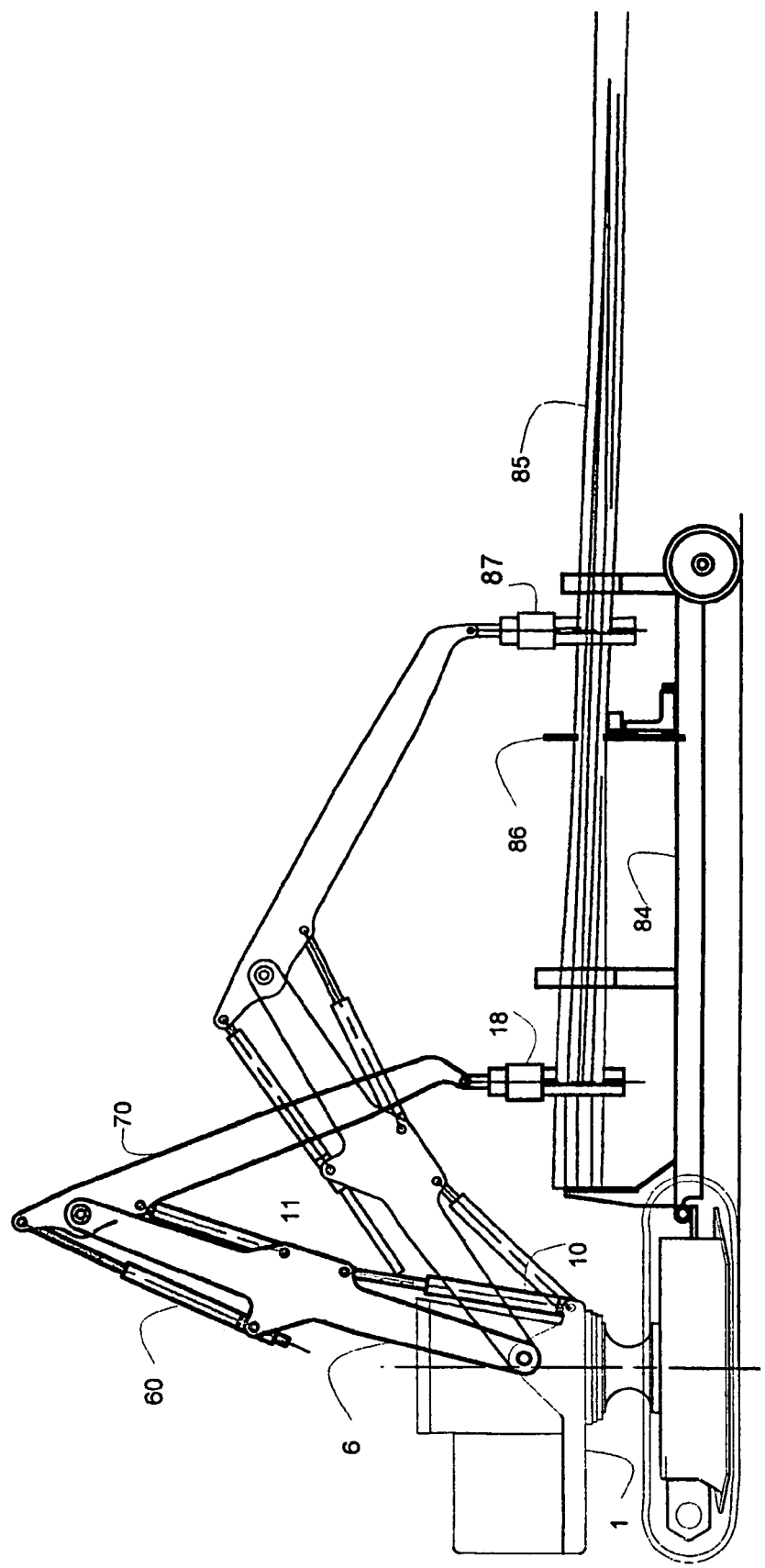
FIG. 6 is a view showing how this present invention is useful for slashing trees into logs by utilizing equal high boom tip speeds in both reach out and tuck in directions.

FIG. 6 is a further case where placing the reach cylinder above the boom yields an advantage. FIG. 6 is an illustration of a logging machine commonly called a slasher and its use in cutting long already limbed trees 85 into logs and piling or loading them. The loader knuckle boom with hoist boom 6 and stick boom 70 and grapple 18 advances trees from position at 87 to a butt plate 92 without the resistance of limb removal. After being slashed with the saw 86 the logs are piled or loaded on a truck and the knuckle boom reaches out empty to grapple more of the trees. Thus since neither direction of reach needs a large force and both directions can benefit from greater speed it is a useful invention to install the double rod ended cylinder 60 in the location above the boom. Hoist cylinder 10 and stick cylinder 11 are connected according to the prior Kurelek patents teachings.

Figure 6B:
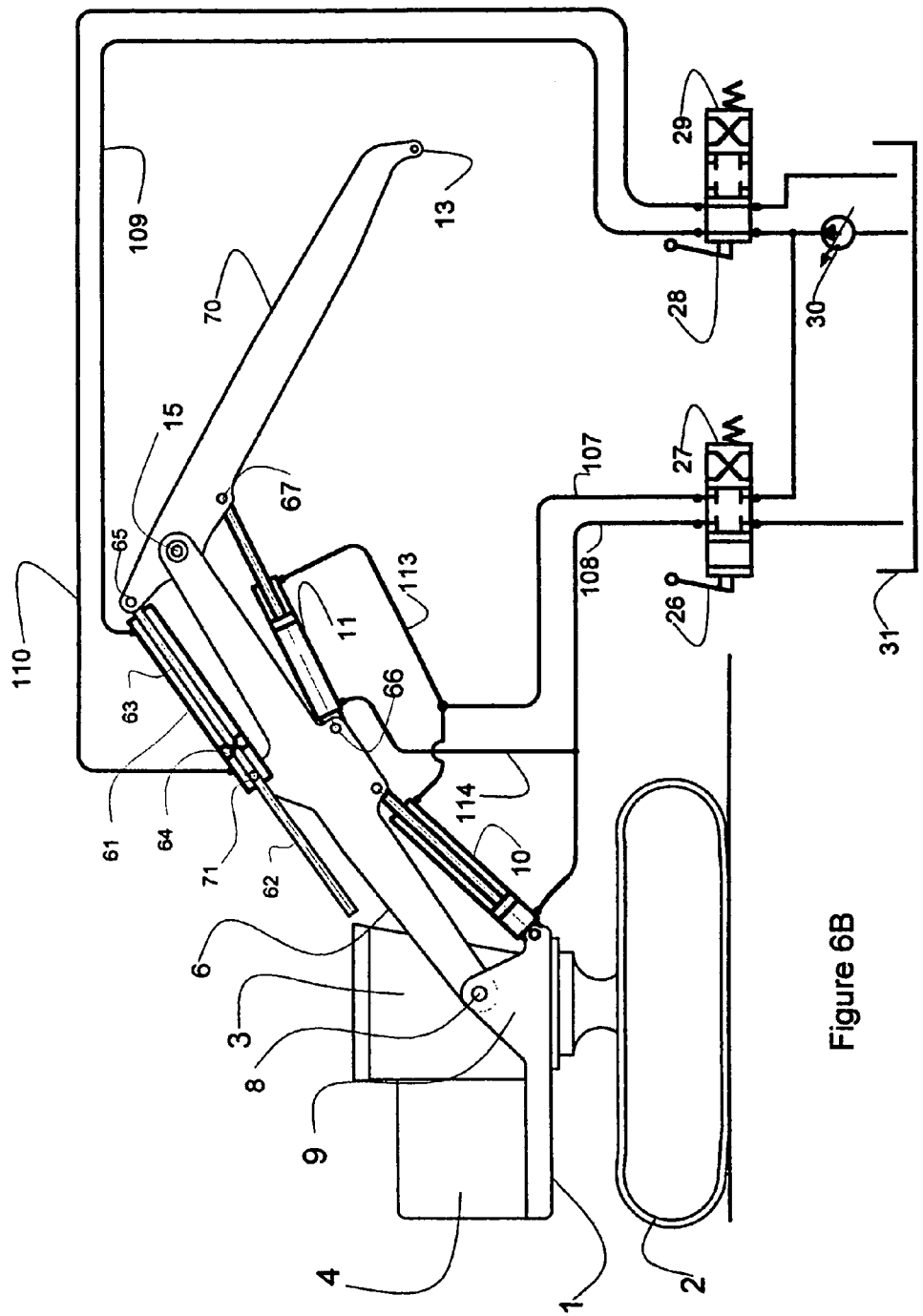
FIG. 6B shows details of the hydraulic connections used in FIG. 6.

In FIG. 6B it is seen that the effective net area for both force and speed on both sides of piston 64 is reduced by rods 62 and 63. Rod diameters could be tailored to get precise speed ratio conditions. The pinning to the hoist boom at 71 must be constructed as a trunnion through which the rod 62 can pass. Whether oil is supplied from the pump 30 via valve 29 and conduit 109 or through conduit 110, the force and speed available at boom point 13 will be the same. It can be visualized from the pictorial appearance of the boom structure at pin 69 on FIG. 3B that there would not easily be clearance for a double rod ended cylinder in the lower location. Having moved the reach cylinder to above the boom has made this improved slasher operation possible.

Figure 7:
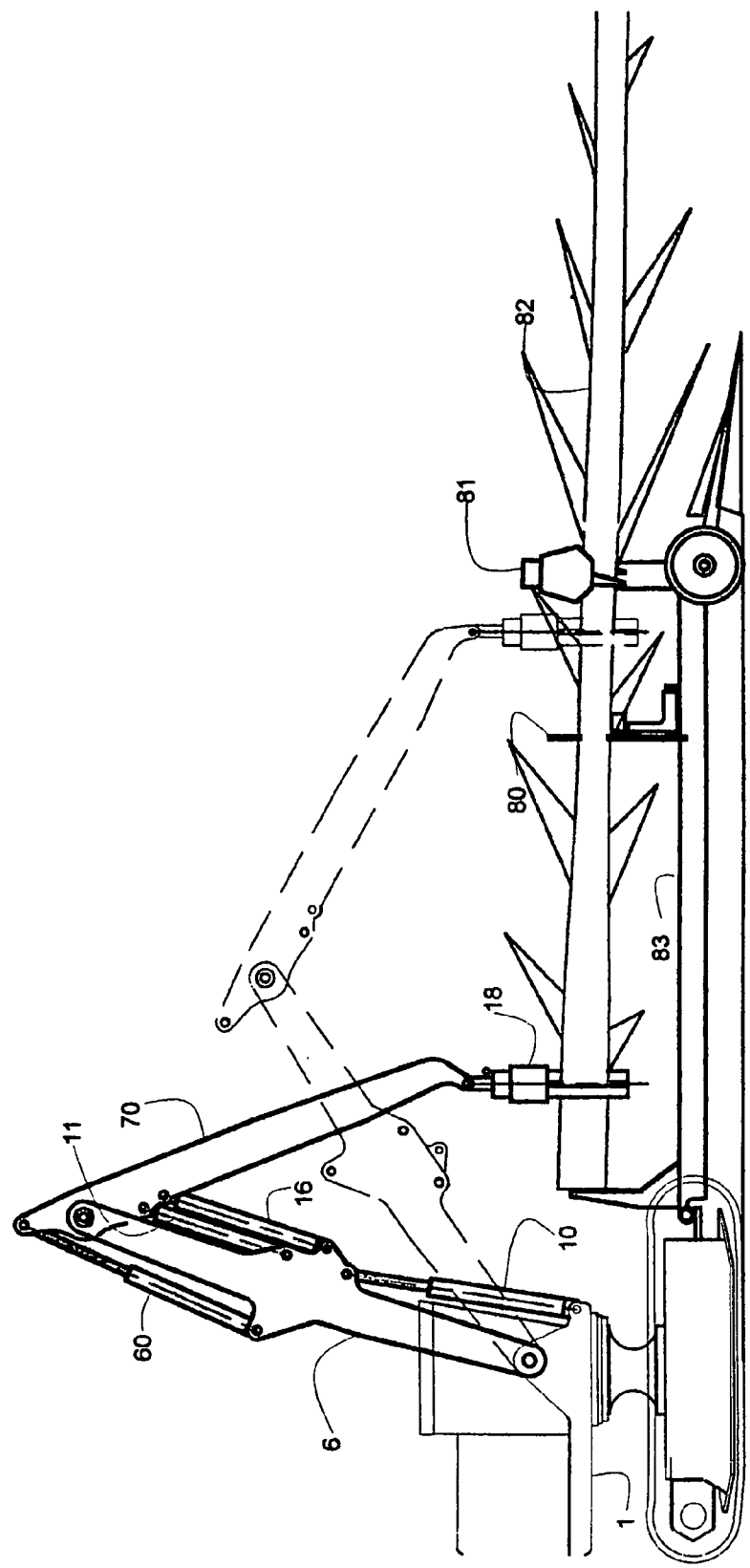
FIG. 7 is a view showing how this present invention is useful for tree limbing where the knuckle boom both pushes and pulls to shear off very difficult limbs.

FIG. 7 illustrates the case where a limby tree 82 is inserted into a bi-directional limbing head 81 at some distance from its butt and then limbed by pushing and pulling with the knuckle boom. A high reach force might be needed in both directions and lower speeds would be accepted. It is a solution to arrange pinning for both a top mounted reach cylinder 60 and a beneath mounted reach cylinder 16.

Figure 7B:
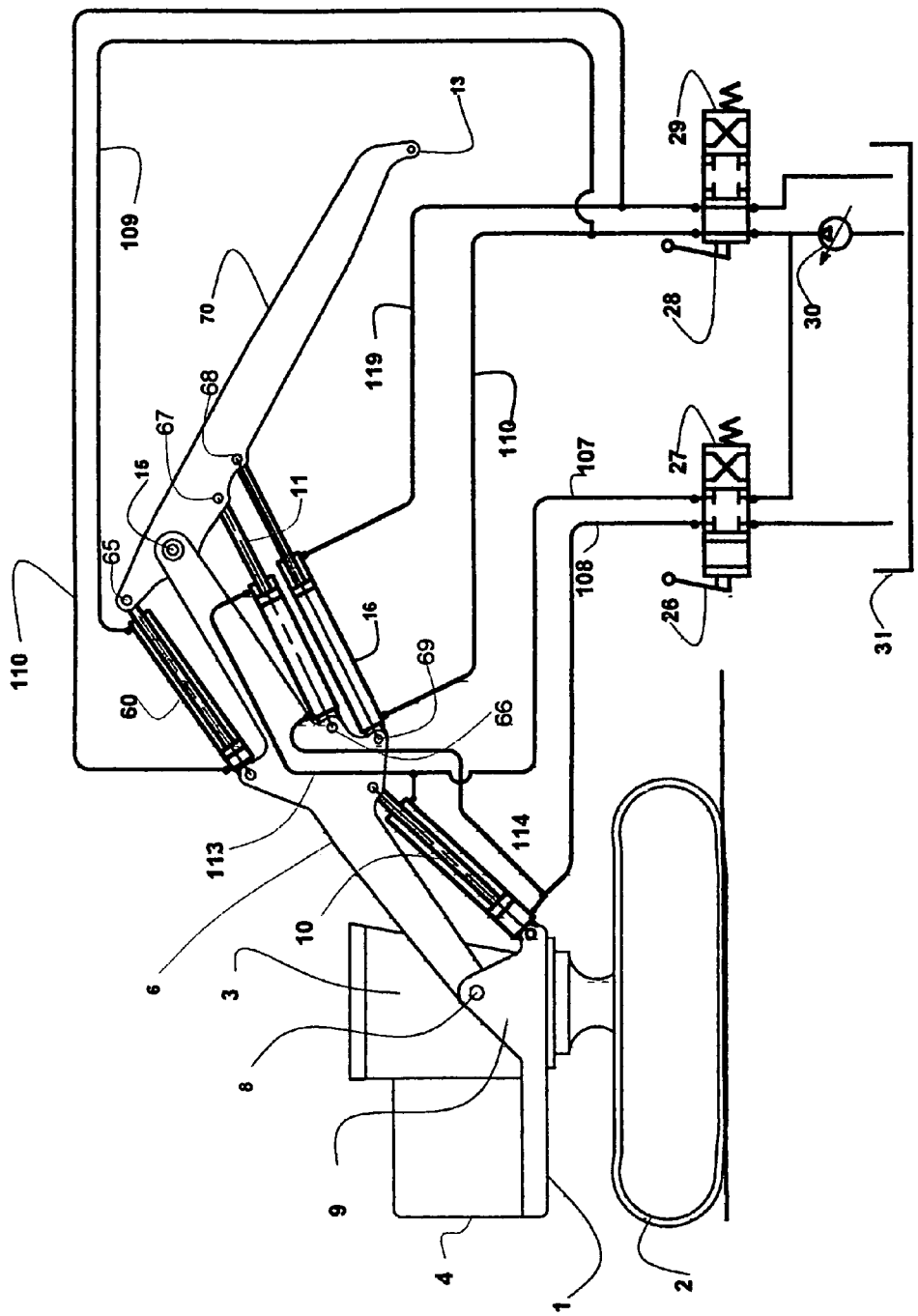
FIG. 7B shows details of the hydraulic connections used in FIG. 7.

In FIG. 7B it is seen that the hoist cylinder 10 and the stick cylinder 11 are connected as per the prior Kurelek patents but that the two reach cylinders are connected so that in a given direction a base end of one works with the rod end of the other. Speeds and forces are approximately equal in both directions.

What is claimed is:

1. A knuckle boom apparatus, comprising:
a machine base;
a hoist boom having a proximal end pivoted to the machine base, and a distal end remote therefrom;
a stick boom having an intermediate pivot pinned to pivot on the distal end of the hoist boom, a distal end configured to carry a working tool and a proximal end having a suitable cylinder push point;
at least one hydraulic hoist cylinder mounted between said machine base and said hoist boom;
at least one hydraulic stick cylinder mounted between said hoist boom and said stick boom;
a hydraulic reach cylinder mounted above said hoist boom between said hoist boom and said suitable push point at said stick boom proximal end, whereby when said hydraulic reach cylinder is actuated by supplying oil to its base end, said distal end of said stick boom is withdrawn towards said machine base; and
a hydraulic circuit for operatively supplying hydraulic oil to said hoist, stick and reach cylinders, wherein said hydraulic circuit comprises at least one hydraulic conduit line connecting respective base end ports of said hoist and stick cylinders so as to allow hydraulic oil to shunt between base ends of said hoist and stick cylinders.

2. A knuckle boom apparatus, comprising:
a machine base;
a hoist boom having a proximal end pivoted to the machine base, and a distal end remote therefrom;
a stick boom having a proximal end and a distal end configured to carry a working tool, and an intermediate pivot where it is pinned to the distal end of said hoist boom;
a hydraulic hoist cylinder mounted beneath said hoist boom and pinned between said machine base and said hoist boom to stroke between said hoist boom and said machine base;
a first stick-located hydraulic cylinder mounted beneath said hoist boom and said stick boom and pinned between said hoist boom and said stick boom to stroke between said hoist boom and said stick boom;
a second stick-located hydraulic cylinder mounted above said hoist boom and pinned between said hoist boom and said proximal end of said stick boom to operate the angle between said hoist boom and said stick boom; and
a hydraulic circuit with at least first and second directional control valves for operatively supplying hydraulic oil to said cylinders;
wherein a base end hydraulic port of said first stick-located hydraulic cylinder is connected via hydraulic conduit to a base end hydraulic port of said hoist cylinder, and said so-connected base end ports are connected via hydraulic conduit to a work port of said first directional valve;
wherein the second of said stick-located cylinders is connected via hydraulic conduit to said second directional valve to operate as a reach cylinder, whereby a manual operation of only said second directional valve causes all said cylinders to stroke simultaneously and said stick boom distal end to move in a desired near-horizontal path; and
wherein said stick boom distal end moves towards said machine base when said second directional control valve supplies oil to a base end of said second stick-located hydraulic cylinder.

3. A knuckle boom apparatus as in claim 2, wherein the second stick located hydraulic cylinder is double rod ended and is trunnion mounted at its base end to the top of the hoist boom.

4. A knuckle boom apparatus as in claim 3, wherein both rods are of the same diameter.

5. A knuckle boom apparatus, comprising:
a machine base;
a hoist boom having a proximal end pivoted to the machine base, and a distal end remote therefrom;
a stick boom having an intermediate pivot pinned to pivot on the distal end of the hoist boom, and a distal end configured to carry a working tool and a proximal end having a suitable cylinder push point;
at least one hydraulic hoist cylinder mounted between said machine base and said hoist boom;
at least one hydraulic stick cylinder mounted between said hoist boom and said stick boom;
a double rod ended hydraulic reach cylinder trunnion mounted between said hoist boom and said suitable push point at said stick boom proximal end, wherein said reach cylinder has base end and rod end piston areas that are both net of rod areas; and
a hydraulic circuit for operatively supplying hydraulic oil to said cylinders, wherein said hydraulic circuit comprises at least one hydraulic conduit line connecting respective base end ports of said hoist and stick cylinders so as to allow hydraulic oil to shunt between base ends of said hoist and stick cylinders;
wherein said reach cylinder is located above said hoist boom so that when said circuit supplies oil to said reach cylinder at its base end said distal end of said stick boom is withdrawn towards said machine base.

6. A knuckle boom apparatus as in claim 5, wherein both rods are of the same diameter.

7. A knuckle boom apparatus, comprising:
a machine base;
a hoist boom having a proximal end pivoted to the machine base, and a distal end remote therefrom;
a stick boom having a proximal end, a distal end configured to carry a working tool, and an intermediate pivot where said stick boom is pinned to the distal end of said hoist boom at an angle;
a hydraulic hoist cylinder mounted beneath said hoist boom and pinned between said machine base and said hoist boom to stroke between said hoist boom and said machine base;
a first stick-located hydraulic cylinder mounted beneath said hoist boom and said stick boom and pinned between said hoist boom and said stick boom to stroke between said hoist boom and said stick boom;
a second stick-located hydraulic cylinder, mounted beneath said hoist boom and said stick boom and pinned between said hoist boom and said stick boom to operate the angle between said hoist boom and said stick boom; and a third stick-located hydraulic cylinder mounted above said hoist boom and pinned between said hoist boom and said proximal end of said stick boom to assist said second stick-located cylinder to operate the angle between said hoist boom and said stick boom; and a hydraulic circuit with at least first and second directional control valves for operatively supplying hydraulic oil to said cylinders;

wherein a base end hydraulic port of said first stick-located hydraulic cylinder is connected via hydraulic conduit to a base end hydraulic port of said hoist cylinder and said so-connected base end ports are connected via hydraulic conduit to a work port of said first directional control valve;

wherein a work port of said second directional control valve is connected via hydraulic conduit to a base end port of said second stick-located cylinder so that said second stick-located cylinder will operate as a reach cylinder;

wherein the same work port of said second directional control valve is also connected via hydraulic conduit to a rod end port of said third stick-located hydraulic cylinder to cause it to assist in acting as a reach cylinder with motion in the same direction of reach as said second stick-located cylinder;

wherein a manual operation of only said second directional control valve causes all said cylinders to stroke simultaneously and said stick boom distal end to move in a desired near-horizontal path;

and wherein said stick boom distal end reaches outward from said machine base when said second directional control valve supplies oil to said base end of said second stick-located hydraulic cylinder and to said rod end of said third stick-located hydraulic cylinder.

8. A knuckle boom apparatus, comprising:

a machine base;

a hoist boom having a proximal end pivoted to the machine base, and a distal end remote therefrom;

a stick boom having an intermediate pivot pinned to pivot on the distal end of the hoist boom at an angle, and a distal end configured to carry a working tool and a proximal end having a suitable cylinder push point;

at least one hydraulic hoist cylinder mounted between said machine base and said hoist boom;

at least one hydraulic stick cylinder mounted between said hoist boom and said stick boom;

a first hydraulic reach cylinder mounted beneath said hoist and stick booms and pinned to operate the angle between said hoist and stick booms;

a second hydraulic reach cylinder, mounted to and above said hoist boom and connected to said push point at said stick boom proximal end and also pinned to operate the angle between said hoist and stick booms; and a hydraulic circuit for operatively supplying hydraulic oil to said cylinders, wherein said hydraulic circuit comprises at least one hydraulic conduit line connecting respective base end ports of said hoist and stick cylinders so as to allow hydraulic oil to shunt between base ends of said hoist and stick cylinders;

wherein when said circuit simultaneously supplies oil to said second reach cylinder at its base end and said first reach cylinder at its rod end, said distal end of said stick boom is withdrawn in a suitable near-horizontal path towards said machine base; and wherein when said circuit simultaneously supplies oil to said first reach cylinder at its base end and said second reach cylinder at its rod end, said distal end of said stick boom is advanced in a suitable near-horizontal path away from said machine base.

* * * * *